United States Patent [19]

Shirai et al.

[11] Patent Number: 4,826,253
[45] Date of Patent: May 2, 1989

[54] WHEEL COVER

[75] Inventors: Noboru Shirai; Toshiyuki Isogai, both of Aichi, Japan

[73] Assignee: Kabushiki Kaisha Tokai Rika, Aichi, Japan

[21] Appl. No.: 81,361

[22] Filed: Aug. 4, 1987

[30] Foreign Application Priority Data

| Aug. 4, 1986 | [JP] | Japan | 61-119889[U] |
| Nov. 20, 1986 | [JP] | Japan | 61-179581[U] |
| Dec. 1, 1986 | [JP] | Japan | 61-185728[U] |
| Dec. 1, 1986 | [JP] | Japan | 61-185729[U] |
| Mar. 31, 1987 | [JP] | Japan | 62-49032[U] |

[51] Int. Cl.$^4$ .............................................. B60B 7/00
[52] U.S. Cl. ........................ 301/37 PB; 301/37 TP; 301/37 P
[58] Field of Search ............... 301/37 R, 37 P, 37 PB, 301/37 TP, 37 C

[56] References Cited

U.S. PATENT DOCUMENTS

| 4,457,559 | 7/1984 | Renz | 301/37 P |
| 4,470,639 | 9/1984 | Loper | 301/37 P X |
| 4,523,789 | 6/1985 | Schwartz | 301/37 P |
| 4,529,251 | 7/1985 | Schobbe . | |
| 4,572,584 | 2/1986 | Brown | 301/37 P X |
| 4,707,035 | 11/1987 | Kondo et al. | 301/37 P |
| 4,708,398 | 11/1987 | Loren | 301/37 TP X |

FOREIGN PATENT DOCUMENTS

| 3543772 | 6/1986 | Fed. Rep. of Germany .... 301/37 R |
| 56-67602 | 6/1981 | Japan . |
| 56-67601 | 6/1981 | Japan . |
| 57-60802 | 4/1982 | Japan . |

Primary Examiner—Robert B. Reeves
Assistant Examiner—Russell D. Stormer
Attorney, Agent, or Firm—Birch, Stewart, Kolasch & Birch

[57] ABSTRACT

The present invention relates to a wheel cover in use for motor vehicles. The wheel cover includes a circular main body, a plurality of holding claws extending from a rear surface of the main body, and a resilient ring to be mounted on the holding claws so as to urge radially outwardly the holding claws. On the rear surface of the main body at positions between the neighboring holding claws are arranged support members each having a groove for receiving the resilient ring. The groove is defined by a bottom surface and a pair of protrusions aligning along the radial direction of the main body. The radial movement of the ring mounted on the holding claws can be regulated by the pair of protrusions so that the expansion of the ring is restricted, resulting in that the holding claws is prevented from expanding radially outwardly, and the ring is prevented from disengaging from the holding claws.

7 Claims, 14 Drawing Sheets

WHEEL COVER

BACKGROUND OF THE INVENTION

1. Field of the Invention

The present invention relates to an automobile wheel cover, and more particularly, to a wheel cover, wherein, when the wheel cover is fixed to a wheel, a plurality of holding claws protruding from the rear surface of the wheel cover are urged toward a rim of a wheel by means of a resilient ring in the radially outward direction.

2. Prior Art

Conventional wheel covers have a variety of constructions: for example, a wheel cover as shown in FIGS. 1 and 2 is described in Japanese first patent Publication No. 67602/1981. Referring to FIGS. 1 and 2, a plurality of holding claws 22 are formed on the rear surface of the wheel cover main body 21, a groove 22a is formed on the radially inside surface of each holding claw 22, and a base portion 23b of an arch-shaped protrusion 23a of the wire ring 23 is pressed to contact with stoppers 24 which is formed at both sides of the holding claw 22 so as to protrude from the rear surface of the wheel cover main body, whereby the radially outwardly spreading force of the wire ring 23 is received by means of the stoppers 24. When holding claws 22 are radially inwardly bent during a mounting operation of the wheel cover onto the wheel, the protrusion 23a of the wire ring 23 is also bent, thereby applying resilient force of the wire ring 23 as well as the resilient force of the holding claw, thus a great resilient force is applied to the holding claw 22 even by a slight degree of bending of the holding claw 22. In the construction described above, when fitting the wheel cover to the wheel, some holding claws 22 of the wheel cover 21 are first bent toward the central portion of the wheel cover so as to abut on the wheel rim, then the rest of the holding claws are gradually bent toward the central portion so as to fit the entire wheel cover to the wheel rim, whereby holding claws 22 are pressed to contact with the wheel rim with the aid of the foregoing resilient force in order to fit the wheel cover 21 to the wheel.

For another construction of a conventional wheel cover as shown in FIG. 3 is described in Japanese first Patent Publication No. 67601/1981. The wheel cover in FIG. 3 has basically the same construction as the one described above; however its construction of the wire ring is altered, i.e., as shown in FIG. 3, a ratio of a radial dimension R from the center of the wire ring 27 to a protrusion 27a and a radial dimension r from the foregoing center to a base portion 27b of the protrusion 27a, is properly set, whereby, as shown by a dotted line in the drawing, when the protrusion 27a is bent inwardly toward the central portion with the aid of the holding claw, the base portion 27b is also bent in the same direction together with the holding claw. Thus, the protrusion 27a of the wire ring 27 is provided with a large stroke so as to resist the resilient force of the wire ring and the foregoing holding claw by means of utilizing a large vacant space located inside the wheel rim.

According to the constructions described above, however, the wire ring is provided with a multiplicity of protrusions, whereby the number of shaping procedures for shaping the protrusions becomes large, increasing the production cost to a great extent. When the number of protrusions of the wire ring is reduced in order to lower the cost for the wire ring, the number of holding claws corresponding to the protrusions is also reduced, resulting in the increased holding force applied on the wheel rim exerted by each holding claw, whereby the bending degree of each holding claw is accordingly increased such that it is difficult for the wheel cover to be fitted in the wheel. Furthermore, there is provided no regulating means for bending the wire ring in the radially inside portion of the wire ring, causing the wire ring to freely bend, whereby the wire ring is apt to be removed from the holding claw.

SUMMARY OF THE INVENTION

The object of the present invention is, therefore, to solve the disadvantages described above, and more particularly, to provide a wheel cover which can be produced at a lower cost, which is easily fitted to the wheel, and once fitted which is firmly secured with the aid of the resilience force of the holding claw as well as the resilient ring, and being free from the worry of being removed.

To achieve the foregoing object, according to the present invention, there is employed a construction wherein the resilient ring is circular and received by support members each having a groove defined by a pair of protrusions for regulating the radial movement of the resilient ring. Specifically, the support member for radially movably supporting the resilient ring is formed between the adjacent holding claws arranged on the rear surface of the wheel cover main body. A pair of protrusions for regulating the radial movement of foregoing resilient ring are formed, at radially inside and outside portions of the surface of the support member confronting the wheel. Further, the radially inside end surface of the protrusion positioned radially outside portion is so arranged as to be located radially outside the radially inside end surface of the groove of the holding claw.

In the construction described above, when fitting the wheel cover to a wheel, some of the holding claws of the wheel cover are bent in the direction of the central portion of the main body, thus causing the resilient ring to bend in the same direction together with the holding craws. The resilient ring is deformed by the bending action, however, the radial movement of the resilient ring is restricted by the protrusions of the support members, whereby the resilient ring itself does not expand radially outwardly and, at the same time, the holding claws of the other portion of the wheel cover do not expand radially outwardly. Then, the wheel cover is fitted to the wheel cover with the rest of the holding claws bent followed by foregoing some holding claws.

BRIEF DESCRIPTION OF THE DRAWING

The above objects and features of the present invention will become apparent from the following description taken in conjunction with the preferred embodiments thereof, with reference to the accompanying drawings, in which:

FIG. 5 is a schematic rear view of a wheel cover having the holding claw as shown in FIG. 14;

DETAILED DESCRIPTION OF THE INVENTION

Embodiment 1

FIGS. 4-11 show Embodiment 1 according to the present invention.

Figure 1:
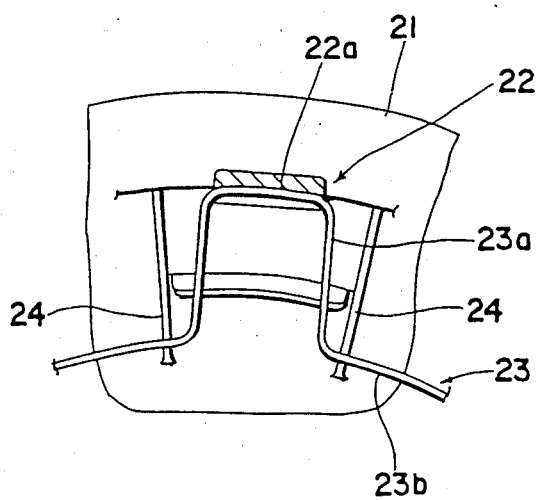
FIGS. 1 and 2 are a rear view and a cross sectional view of a main portion of a conventional wheel cover, respectively, as previously described.
Figure 2:
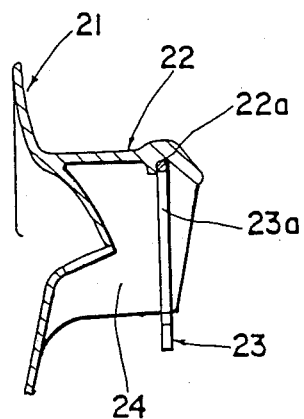
Figure 3:
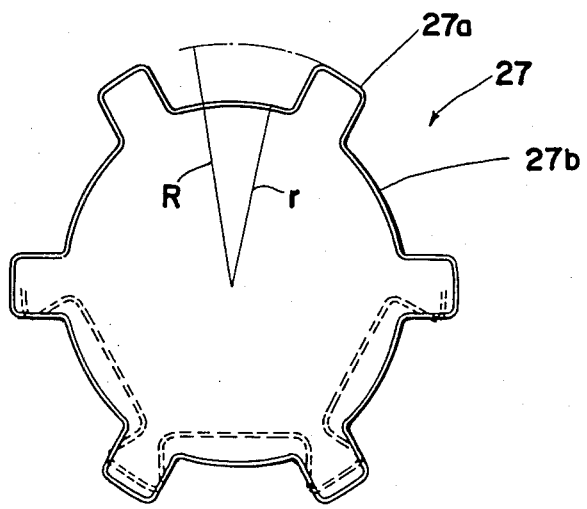
FIG. 3 is a plan view showing a wire ring of another conventional wheel cover, as previously described.
Figure 4:
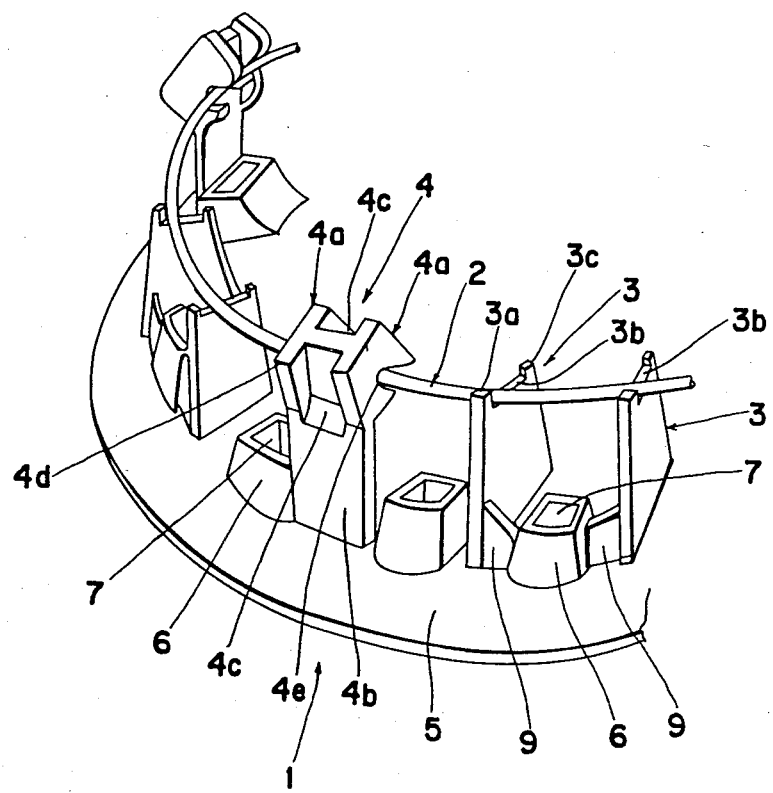
FIGS. 4 and 5 are a perspective view and a rear view, respectively, showing a rear main portion of a wheel cover of Embodiment 1 according to the present invention.
Figure 6:
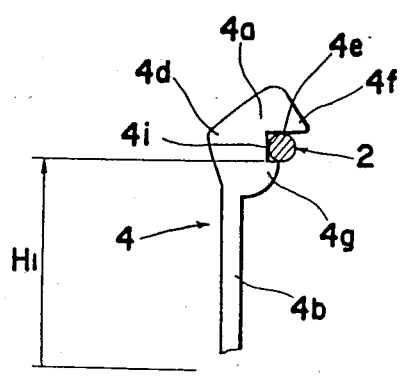
FIGS. 6 and 7 are a cross sectional view taken on line VI—VI and line VII—VII of FIG. 5, respectively.
Figure 7:
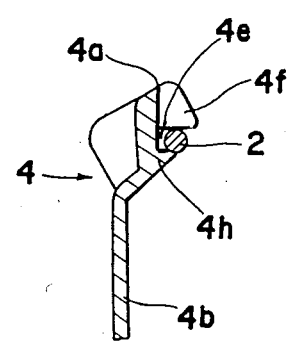
Figure 5:
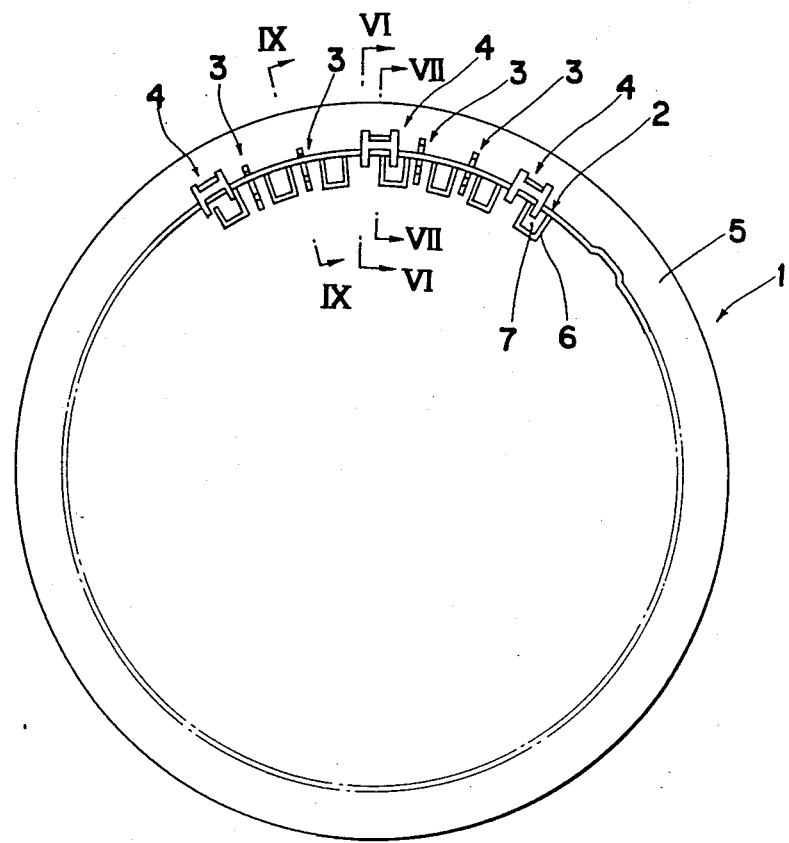
Figure 8:
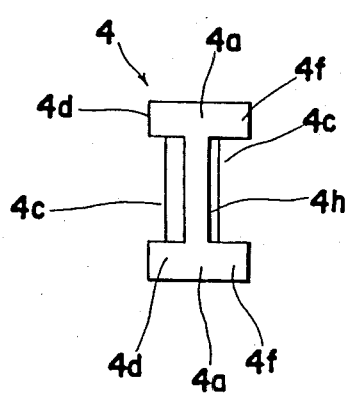
FIG. 8 is a top plan view of a holding claw according to Embodiment 1.
Figure 9:
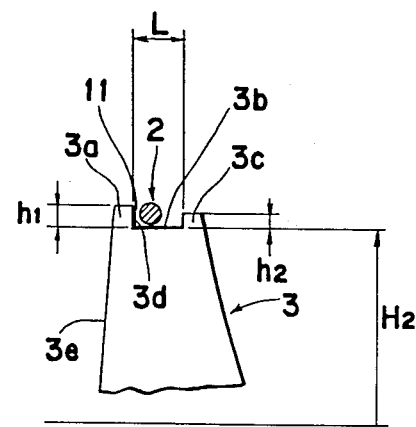
FIG. 9 is a cross sectional view taken on line IX—IX of FIG. 5.

Referring to FIGS. 4 and 5, a wheel cover 1 according to the present invention is generally provided with a plurality of holding claws 4 formed on the rear surface of a synthetic-resin-made wheel cover main body 5, and support members 3 arranged between adjacent holding claws 4, whereby a circular metal wire ring 2 used as a resilient ring is engaged with foregoing holding claws 4 and support members 3, so that the radial movement of the wire ring 2 is regulated by the support members 3.

The foregoing wheel cover 1 is composed of an approximately circular plate, i.e., main body 5, a plurality of holding claws 4 and support members 3 are integrally formed at regular intervals on the rear surface of the circular plate 5, and an opening 7 for allowing air to flow therethrough which is surrounded by a reinforcement wall 6 properly formed at the portion between the holding claw 4a and support members 3, as well as at the portion between adjacent support members 3.

A plurality of holding claws 4 are, as shown in FIG. 4, formed at regular intervals on the rear surface of the wheel cover main body 5. A shown in FIGS. 6-8, each holding claw 4 comprises a leg portion 4b protruding from the rear surface of the wheel cover main body 5, and a pair of head portions 4a formed at the tip of the leg portion 4b. The radial outside surface of the head portion 4a is provided with an engaging portion 4d protruding in the form of a triangle in cross section so as to engage with the concave portion 8b of the rim 8a of wheel 8. A groove 4e is formed on the radial inside surface of the head portion 4a. A wire ring 2 is inserted in the groove 4e. The upper surface of the groove 4e is provided with a first protrusion 4f, the lower surface of the groove 4e is provide with a second protrusion 4g. A third protrusion 4h is formed at the portion corresponding to the second protrusion 4g and below a space 4c between the pair of head portions 4a. Therefore, the wire ring 2 in the groove 4e is engaged with the first protrusion 4f and second protrusion 4g, and at the same time, the wire ring 2 between both head portions 4a and 4a is supported by the third protrusion 4h, thereby positioning the wire ring 2. The first protrusion 4f is formed to protrude radially inwardly more than the second protrusion 4g so as to prevent the wire ring 2 from being removed from the groove 4e in the upward direction in view of FIGS. 6 and 7.

Also, the foregoing leg portion 4b is so flexible that, when the wire ring 2 is inserted into the groove 4e and subsequently when the wheel cover 1 is fitted to the wheel 8, the leg portion 4b is slightly, radially, and resiliently can bend so as to allow the wire ring 2 to be smoothly inserted slightly into the groove 4e, as well as the wheel cover 1 to be fitted to the wheel 8.

Moreover, a pair of support members 3 are formed between the adjacent holding claws 4 and 4. Each support member 3 is a plate member arranged on the rear surface of the main body 5. The surface of the plate member 3 is arranged in the radial direction. The plate member 3 has sufficient thickness and width so as not to be deformed even if a radial force is applied, and not to be excessively bent even if a circumferential force is applied. Also, the above-described support member 3 is connected to the reinforcement wall 6 through a plate member 9 so as to be securely prevented from being excessively bent circumferentially by the force applied circumferentially thereto.

The support member 3 described above is, as shown in FIG. 9, provided with a pair of protrusions 3a and 3c formed at radially outside and inside portions of an upper surface confronting the wheel, respectively, and a groove 3b extending radially between the protrusions 3a and 3c, whereby the wire ring 2 is radially movably inserted into the groove 3b located between the protrusions 3a and 3c. A height h1 of the first protrusion 3a with respect to the groove bottom surface, is formed to be greater than a height h2 of the second protrusion 3c with respect to the groove bottom surface, and greater than a wire diameter of the wire ring 2, thereby preventing the wire ring 2 in the groove 3b from radially outwardly expanding. The second protrusion 3c is formed to be lower than the first protrusion 3a so that the wire ring 2 can be easily inserted into the groove 3b. Namely, the wire ring 2 is inserted into the groove 3b from the radially inside position over the second protrusion 3c to the outside direction. The second protrusion 3c prevents the wire ring 2 from being removed from the groove 3b when the wire ring 2 is inserted into the groove 3b.

A groove end surface 3d of the first protrusion 3a is so formed to be located on the circumference of the groove end surface 4i of the holding claw 4, or slightly radially outside the circumference of the groove end surface 4i of the holding claw 4, wherein the wire ring 2 inserted in the groove 4e of the holding claw 4 is so arranged to make a small clearance 11 between the end surface 3d of some first protrusions 3a and end surface 4i of the holding claw 4. According to the construction described above, the wire ring 2 can exert a resilient force much greater on the holding claw 4 than on the support member 3 by the amount enhanced by means of the clearance 11, whereby the wheel cover 1 can be securely held and pressed to contact with the wheel 8. A radial length L of the groove 3b of the support member 3, is so formed to allow the wire ring 2 to deform or move due to the bending of the holding claw 4 when fitting the wheel cover 1 to the wheel 8, while the radial length L should be so formed not to allow the wire ring 2 to deform or move when an excessive bending is generated on the holding claw 4. Also, a height H2 of the bottom surface of the groove 4e from the reference surface of the wheel cover 1 is so designed to be lower than a height H1 of the bottom surface of the holding claw 4 from the reference surface of the wheel cover 1. Therefore, the wire ring 2 can move in the groove 3b of the support member 3 and the wrie ring 2 is prevented from falling to the rear surface of the wheel cover main body 5 between the holding claws 4 and 4. In addition, under the condition wherein the wheel cover 1 is fitted to the wheel 8 in a normal manner, a clearance 10 is maintained between the outside end surface 3e of the support member 3 and the rim 8a of the wheel 8, such that when an excessively eccentric load is applied to the wheel cover 1, the support member 3 is pressed to contact with the wheel 8 so as to eliminate the clearance 10, thereby preventing an excessive bending of the wheel cover.

Figure 10:
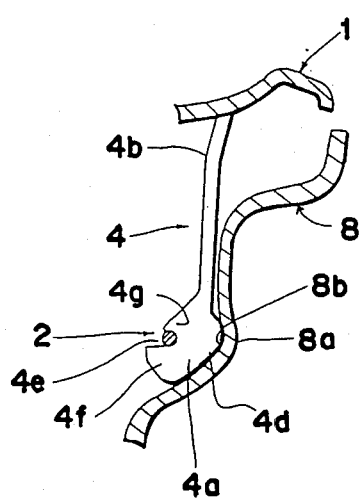
FIGS. 10 and 11 are cross sectional views of the main portion of the wheel cover attached to a wheel.
Figure 11:
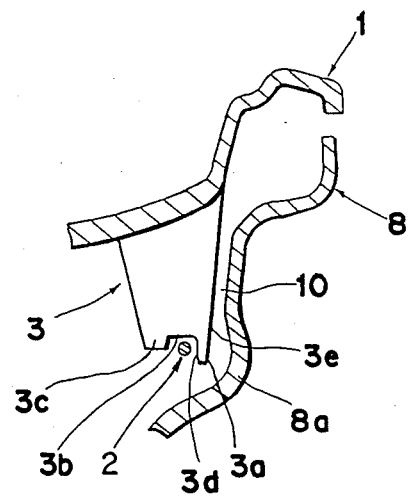

According to the construction described above, as shown in FIG. 4, the wire ring 2 is inserted into the grooves 4e of the holding claws 4 from over the rear surface of the wheel cover main body 5 with the holding claws 4 bent radially outwardly, then the wire ring 2 is supported by the grooves 3b of the support members 3 so as to be radially movable. When the wire ring 2 is inserted into the groove 4e of the holding claw 4, the wire ring 2 is slightly bent, thus the resilient force exerted by the bending movement acts on the holding claw 4, pressing slightly, radially, and outwardly the holding claw 4. Further, as shown in FIGS. 10 and 11, when some holding claws 4 of the wheel cover 1 to which the wire ring 2 is fitted, are pressed to contact with the rim 8a of the wheel 8, those holding claws 4 and the wire ring 2 in the grooves 4e of the holding claws 4 are radially inwardly bent together. At this time, the portion other than the portion to which the bending force of the wire ring 2 is applied, is apt to extend radially outward. Subsequently, when some holding claws 4 are pressed into the wheel 8, the rest of the holding claws 4 other than the foregoing holding claw 4 are also apt to extending outwardly. However, they are prevented from extending outwardly by means of the first protrusion 3a of the groove 3b of the support member 3. Accordingly, some holding claws 4 and the rest of the holding claws are easily radially inwardly bent, thus the wheel cover 1 is fitted to the wheel 8. The wheel cover 1 is fitted in the wheel 8 together with the holding claw 4, with the wire ring 2 being bent, whereby the engaging portion 4d is engaged with the concave portion 8b of the rim 8a of the wheel 8 with the aid of the combined resilient force exerted by the wire ring 2 and the holding claw itself, thus the wheel cover 1 is securely fitted to the wheel 8. The wheel cover 1 can be removed from the wheel 8 by means of releasing the engagement of some holding claws 4 of the wheel cover 1 with respect to the rim 8a.

According to the embodiment described above, the support members 3 are formed, at the adjacent holding claws 4, on the rear surface of the main body 5, and the wire ring 2 is inserted into the grooves 4e of the holding claws 4 as well as into the grooves 3b of the foregoing support members 3, whereby when the wheel cover 1 is fitted to the wheel, some holding claws 4 are bent toward the central portion together with the wire ring 2, the rest of the holding claws 4 are apt to extend radially outwardly due to the resilient force exerted by the deformed wire ring 2. However, since the first protrusions 3a of the grooves 3b of the support members 3 prevents the wire ring 2 from moving radially outwardly, the rest of the holding claws 4 can be bent inwardly toward the central portion with a relatively small force, thus in general, facilitating the wheel cover 1 to be fitted to the wheel 8. Also, even if an external force is applied to the holding claw 4 so as to excessively deform some holding claws 4, the radial movement of the wire ring 2 is restricted by both protrusions 3a and 3c of the support member 3, whereby the holding claw 4 is effectively prevented from being excessively deformed with the aid of the wire ring 2. When the wheel cover 1 is fitted to the wheel 18, the holding claws 4 are securely pressed to contact with the rim 8a of the wheel 8 by means of the combined resilient force of the holding claw 4 itself and wire ring 2, so that the wheel cover 1 is securely held by the wheel 8.

Although the present invention has been fully described by way of an embodiment with reference to the accompanying drawings, it is to be noted here that various changes and modifications will be apparent to those skilled in the art. For example, the configuration of the support member 3 may be integrally formed with the reinforcement wall 6, and the holding claws 4 may be formed in any desired number under the condition that the holding claws can perform the same function as that described above. In addition, a plate member 9 independent of the reinforcement wall 6, may radially reinforce the support member 3 with respect to the wheel cover main body 5. The reinforcement of the support member 3 is not limited only to the configuration wherein a plate member 9 is formed at one side of the support member 3, but the support member 3 may be reinforced by two plate members formed at both sides of the support member 3.

Embodiment 2

Figure 12:
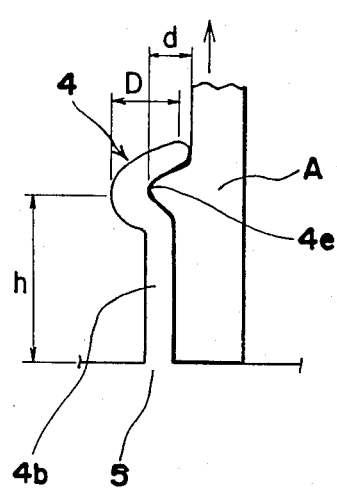
FIGS. 12 and 13 are explanatory views showing the movement of the metal mold when molding the holding claws of the wheel cover according to Embodiment 1.
Figure 13:
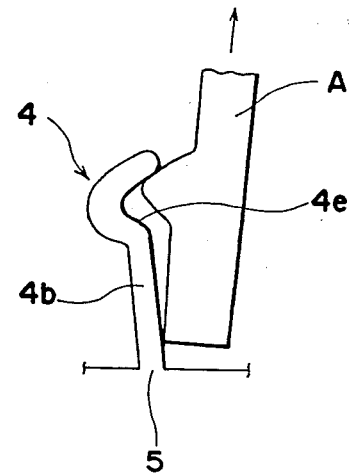

The wheel cover according to Embodiment 1 has a following disadvantage. Referring to FIG. 12, which schematically shows a holding claw 4, when forming holding claws 22 on the wheel cover main body 21a, a piece of metal mold A which is positioned inside the holding claws 4 and which forms the inside surface of the holding craw having the foregoing groove 4e is, as shown in FIG. 13, drawn after completion of injection molding in such a manner that the metal mold 24 is moved upwardly so as to radially outwardly bend the holding claws.

At this time, a forcible drawing quantity d is restricted by length h of the holding claws 22. A guide quantity D of the tip portion of the holding claw 4 is also restricted. As a result, when mounting the wheel cover on a rim of a wheel, the tip portion of the holding claw cannot be sufficiently guided with respect to the wheel. Therefore, the holding claws are not smoothly bent toward the central portion of the wheel cover main body, nor is the wheel cover smoothly fitted to the wheel. Furthermore, the wire ring may be removed during transportation of the wheel cover.

Accordingly, the object of Embodiment 2 is to solve the foregoing disadvantage, i.e., to provide a wheel cover wherein the holding claw will have a sufficient strength, the resilient ring such as wire ring can be securely engaged to the holding claw, and moreover, the wheel is easily fitted in the wheel cover.

FIGS. 14 through 20 shows Embodiment 2.

Figure 14:
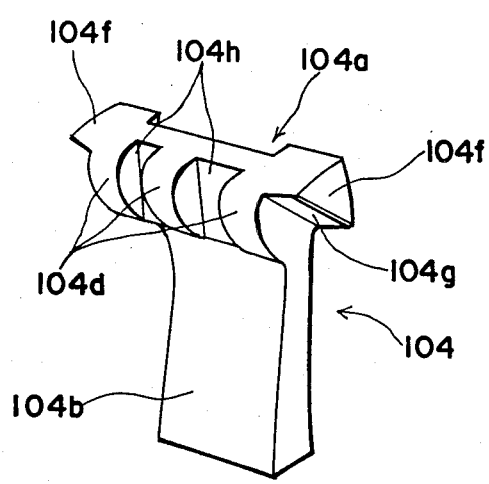
FIG. 14 is a perspective view of a holding claw of a wheel cover according to Embodiment 2 of the present invention.
Figure 15:
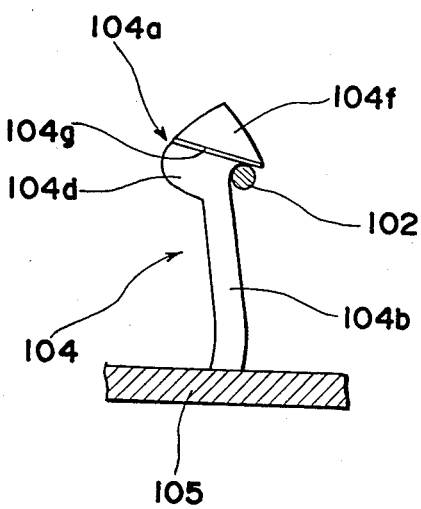
Figure 16:
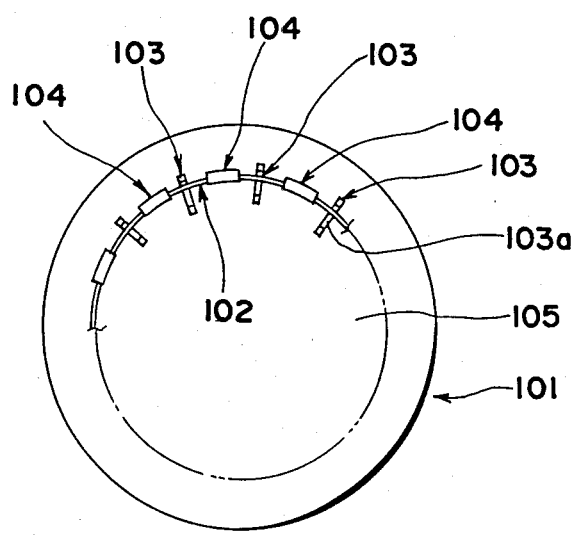
FIG. 16 is a schematic rear view of the wheel cover.
Figure 17:
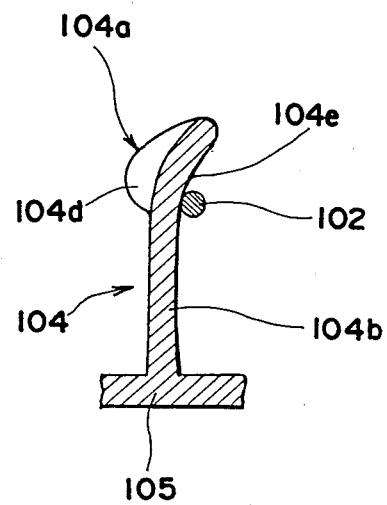
FIG. 17 is a vertical sectional view of the holding claw as shown in FIG. 14.

Referring to FIGS. 14–16, a wheel cover 101 according to Embodiment 2 has generally, as shown in FIGS. 14 through 16, such a construction, wherein a plurality of holding claws 104 are provided on its rear surface of the synthetic-resin-made wheel cover main body 105. Protrusions 104f are integrally formed on the circumferential side ends of each holding claw 104. Support members 103 are formed at both sides of each holding claw 104. A circular metal wire ring 102 serving as a resilient member is engaged with two protrusions 104f of the holding claws 104 and the support members 103. Accordingly, a radial movement of the wire ring 102 is generally controlled by the support members 103.

The wheel cover 101 is generally comprises a wheel cover body, i.e., a circular plate, a multiplicity of holding claws 104 and support members 103 being integrally circumferentially formed on its rear surface at regular intervals. A plurality of holding claws 104 are, as shown in FIG. 16, arranged at regular intervals on the rear surface of the wheel cover main body 105. Each holding claw 104 generally comprises a leg portion 104b protruding from the rear surface of the wheel cover main body 105, and a head portion 104a having a groove 104e, formed at the tip portion of the leg portion 104b, into which the wire ring 102 is inserted. The radial outside surface of the head portion 104a is provided with an engaging portion 104d protruding outwardly, which is to be engaged with a concave portion 108b of a rim 108a of the wheel 108. The groove 104e is formed on the inside surface of the head portion 104a, into which the wire ring 102 is inserted. A protrusion 104f is formed in the form of a triangle in cross-section at both ends of the head portion 104a of the holding claw 104 along the circumferential direction. The radial inside tip portion of each protrusion 104f protrudes radially inwardly over the inside surface of the groove 104e and the wire ring 102 fitted in the groove 104e. The lower surface of each protrusion 104f is a slant 104g, which is slanted radially from outside to inside so as to approach the wheel cover main body 105. The angle formed by the radial inside surface of the head portion 104a of the holding claw and the slant 104g is less than 90 degrees. The wire ring 102 inserted into the groove 104e is engaged with both protrusions 104f. In this case, since the leg portion 104b of the holding claw 104 is flexible, it can bend resiliently with respect to the rear surface of the wheel cover main body 105, so that the wire ring 102 can be inserted smoothly and slightly into the groove 104e. Furthermore, when the wheel cover 101 is fitted into the wheel 108, the leg portion 104b allows each holding claw 104 to bend easily in the radially inward direction, thereby facilitating the wheel cover 101 to be fitted smoothly into the wheel 108. The foregoing engaging portion 104d is provided with concave portions 104h so as to prevent a sink which is liable to occur at the time of injection-molding of the holding claws.

Figure 18:
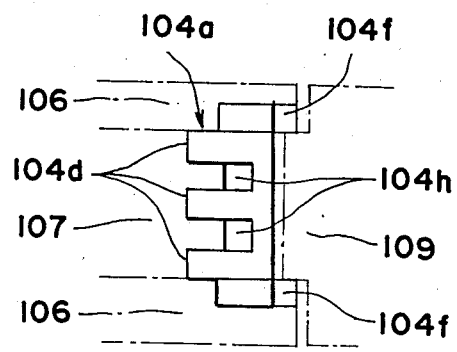
FIG. 18 is a top plan view of the holding claw as shown in FIGS. 14-17.
Figure 19:
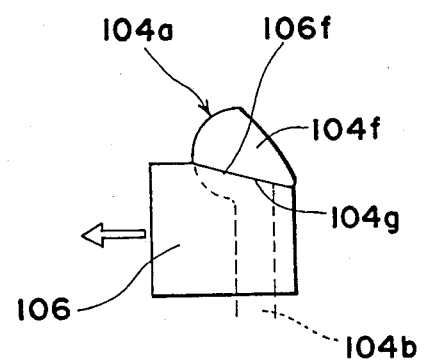
FIG. 19 is an explanatory view according to Embodiment 2 showing the movement of the metal mold when molding the holding claw.

The above-described holding claw 104 is formed, as shown in FIGS. 18 and 19, by means of the conventional molding method using the following some pieces of metal molds; a pair of radially-movable first metal molds 106 for molding the slant 104g of each protrusion 104f, a second metal mold 107 for molding the radially outside surface of the holding claw 104, and a third metal mold 109 for molding the groove 104e and the radially inside surface of the holding claw 104. Each of the foregoing first metal mold 106 is provided with a slant 106f slanting toward the central portion of the wheel cover main body. The first metal mold 106 molds the protrusion 104f with the aid of the second metal mold 107 and third metal mold 109.

The first support member 103 is made of an approximately rectangular plate which is positioned on the rear surface of the wheel cover 104 in such a way that the plate surface is positioned along the radial direction and has enough width and thickness not to when subjected to the radial force and to the circumferential force. At the top end surface of each first support member 103 is formed a groove 103a which controls the radial movement of the foregoing wire ring 102 so that the wire ring 102 does not excessively move in the radial direction in conjunction with the holding claw 104.

Figure 20:
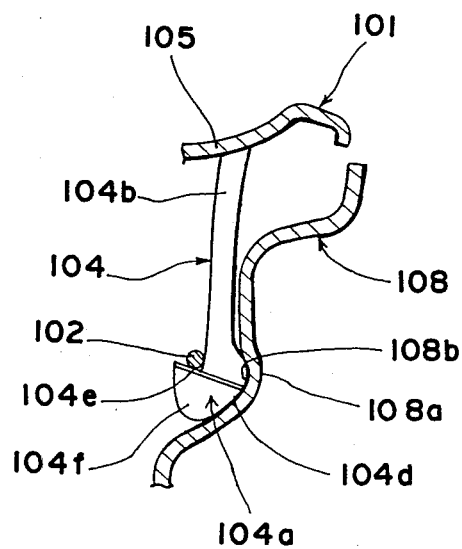
FIG. 20 is a sectional view of the main portion of the wheel cover according to Embodiment 2 showing the engagement of the wheel cover and wheel.

According to the construction described above, the wire ring 102 is inserted into the groove 104e and is engaged with both protrusions 104f with the holding claw 104 outwardly bending in the radial direction. The wire ring 102 is also inserted into and supported by a groove 103a of the first support member 103 as to be movable in the radial direction. When the wire ring 102 is inserted into the groove 104e of each holding claw 104, the wire ring 102 is slightly deformed. The resilient force generated by this bending motion acts on the groove 104e of each holding claw 104, and slightly presses each holding claw 104 outwardly in the radial direction. Moreover, as shown in FIG. 20, when the holding claws 104 of the wheel cover 1, wherein the wire ring 102 is fitted, are pressed into contact with the rim 108a of the wheel 108 and the holding claws are bent inwardly in the radial direction, the wire ring 102 in the groove 104e of the holding claws 104 is bent together with the holding claws 104 inwardly in the radial direction. The engaging portion 104d is engaged with the concave portion 108b of the rim 108a of the wheel 108 with the aid of the combined resilient force exerted by the wire ring 102 and the holding claws 104 themselves, thus the wheel cover 101 is securely attached to the wheel 108. The wheel cover 101 can be removed from the wheel 108 by means of releasing the engagement of some holding claws 104 with respect to the rim 108a.

In Embodiment 2 described above, as described above, both ends of the holding claw 104 are provided with protrusion 104f, and the inside surface of the head portion 104a and the protrusions 104f are circumferentially positioned at different locations so as to be molded by the metal molds 106, 106, 107, and 109 which radially slide and the slant 104g of each protrusion 104f is formed so as to slant radially inwardly with respect to the wheel cover main body. Therefore, an angle formed by the inside surface of the head portion 104a of the holding claw and the slant 104g becomes less than 90 degrees, thus the wire ring 102 is securely engaged with the protrusion 104f, without fearing that the wire ring is removed.

Also, the holding claws 104 are formed by means of moving the metal molds 106, 106, 107, and 109 approximately along the rear surface of the wheel cover main body 105, whereby the leg portion 104b of each holding claw 104 can be easily formed so as to have a sufficient thickness, and thus the holding claw 104 can be provided with a sufficient strength. Further, protrusions 104f are formed on both side ends of the holding claw 104, and the wire ring 102 is inserted into the grooves 104e of the holding claws 104 as well as being engaged with the foregoing protrusions 104f. After the wheel cover 101 is fitted to the wheel 108, the holding claws 104 can be securely pressed into contact with the rim 108a of the wheel 108 with the aid of the resilient force generated by the wire ring 102 and the resilience force of the holding claws 104 themselves, thus the wheel cover 101 can be securely fitted to the wheel 108.

Alternatively, the configuration of the holding claw 104 and protrusion 104f may be of any desired configuration provided that the configuration can have the same functions as those of the embodiment described above. Furthermore, the holding claw 104 may be so constructed as to have no groove 104e on the foregoing holding claw 104, but instead, the wire ring 102 may be simply abutted on the inside surface of the head portion 104a, or the wire ring 102 may be arranged facing the inside surface with a small clearance therebetween.

Meanwhile, the configuration of the outside surface of the head portion 104a of the holding claw 104 influences greatly on the degree of ease in fitting the wheel cover 101 to the wheel. That is as clearly shown in FIGS. 21, 22A, 22B, and 22C, when the wheel cover 101 is fitted into the wheel 108, the outside surface 104h of the head portion 104a abuts on the curved portion 108b of the rim 108a of the wheel 108, thereby causing a frictional resistance.

Figure 21:
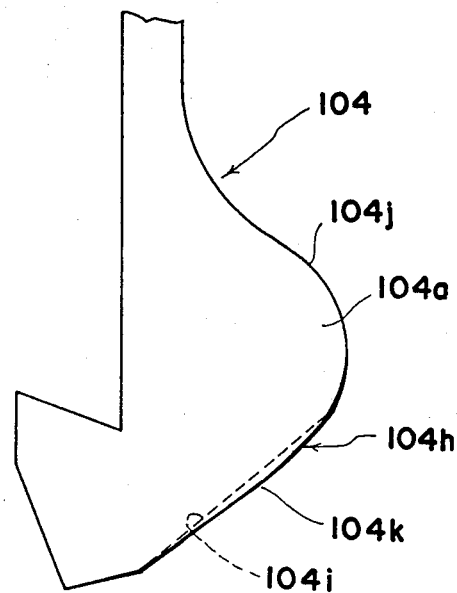
FIG. 21 is an enlarged explanatory side view of the holding claw as shown in FIG. 14.

The outside surface 104h of the head portion 104a is normally comprises a flat surface 104i, as shown by a dotted line in FIG. 21, followed by a curved surface 104j. However, the inventors of the present invention have found through various experiments that a gently curved surface 104k as shown by a solid line in FIG. 21 is better than the foregoing 104i. The following description deals with the configuration of the gently curved surface 104k.

Figure 22A:
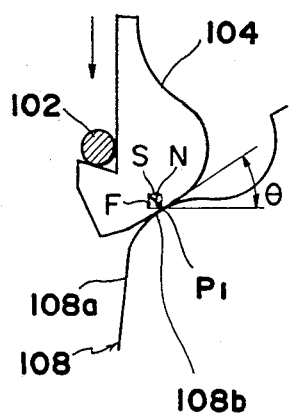
FIGS. 22A, 22B and 22C are, respectively, explanatory views showing the process of fitting the holding claw to the wheel.
Figure 22B:
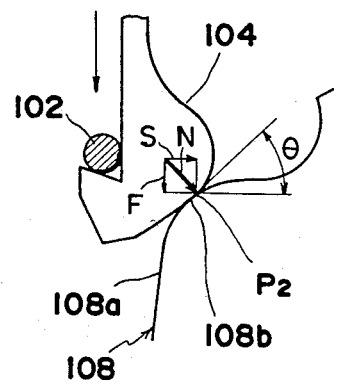
Figure 22C:
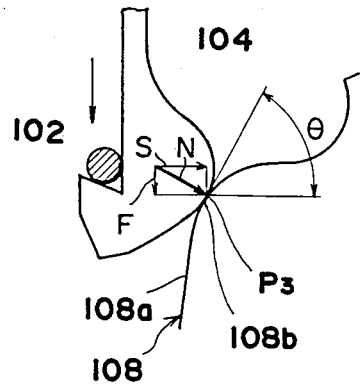

FIGS. 22A through 22C show that the holding claw 104 slides on the curved surface 108b of the wheel 108 wherein FIG. 22A shows the initial stage, FIG. 22B shows the intermediate stage, and FIG. 22C shows the final stage.

Supposing that with respect to the pressing force of the wheel cover against the wheel, N represents a perpendicular reaction force against the curved surface 108b of the holding claw 104, F represents a component of force (pressing force) of N in the pressing direction to the wheel cover, S represents a perpendicular component of force (reaction force of the ring 102) of N in the pressing direction of the wheel cover, then the relationships of the forces can be stated in the following equation shown below where $\theta$ represents an angle formed by the tangent line of the holding claw 104 and curved surface 108b with respect to the perpendicular line in the pressing direction of the wheel cover. The relationship between S and F can be stated in the following equation:

$$F = \frac{1}{\tan\theta} \cdot S$$

(A) Initial stage (FIG. 22A)
N: small
S: small
F: small $\frac{1}{\tan\theta}$ : large (B) Intermediate stage (FIG. 22B)
N: medium
S: medium
F: large $\frac{1}{\tan\theta}$ : large (C) Final stage (FIG. 22C)
N: large
S: large
F: small $\frac{1}{\tan\theta}$ : small As shown above, the pressing force F becomes maximum in the intermediate stage wherein the wheel cover is fitted into the wheel. To reduce the pressing force F, a value of $1/\tan\theta$ should be reduced, i.e., a value of $\theta$ should be increased. The inventors of the present invention have found that the value of the pressing force F can be generally reduced by means of manipulating the value $\theta$, i.e., by means of making the value in accordance with the solid line representing the curved surface 104k in FIG. 21. FIGS. 23A through 23D show the relationships between S, $\theta$, $1/\tan\theta$, and F with respect to the bending degree of the holding claw.

Figure 23A:
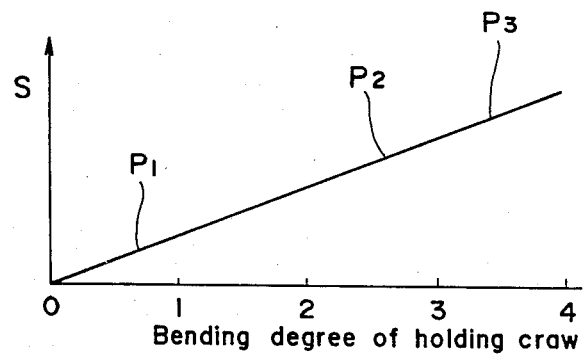
FIGS. 23A, 23B, 23C and 23D are, respectively, graphs showing the relationships of the values of S, $\theta$, 1/tan $\theta$, and F with respect to the bending degree of the holding claw.
Figure 23B:
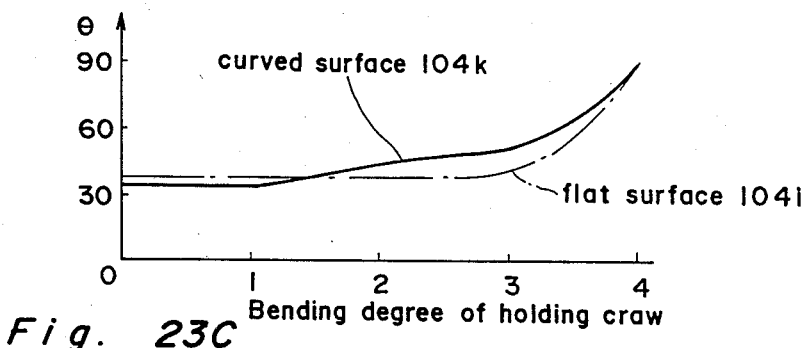
Figure 23C:
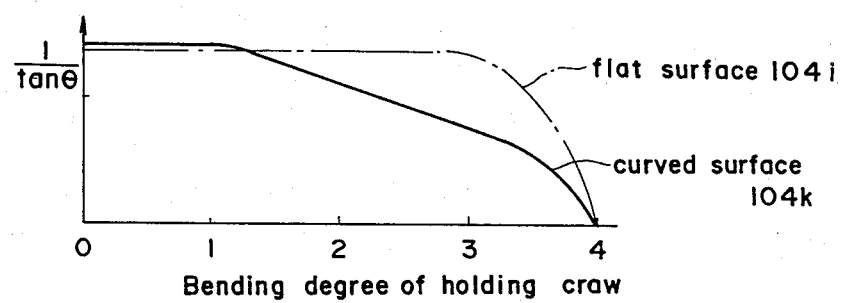
Figure 23D:
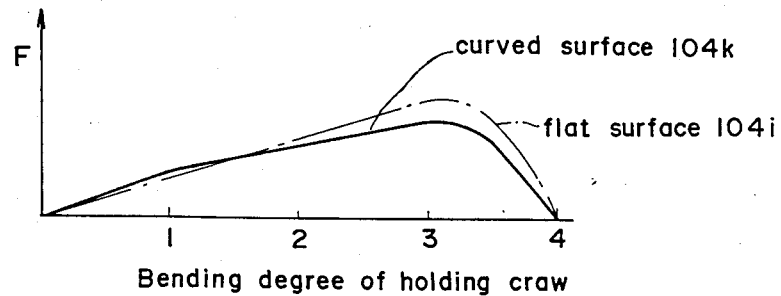

In FIG. 23A, ($P_1$), ($P_2$), and ($P_3$) show the initial stage, intermediate stage, and the final stage corresponding to FIG. 22A, FIG. 22B, and FIG. 22C, respectively. As shown in the figures, in the initial stage, the value $\theta$ of the flat surface 104i is larger than that of the curved surface 104k (FIG. 23B). Accordingly, regarding the curved surface 104k, $1/\tan\theta$ is large, and F is also small (FIG. 23D). In the intermediate stage and final stage, however, a value $\theta$ of the curved surface 104k is larger than that of the flat surface 104i (FIG. 23B). Accordingly, regarding the curved surface 104k, $1/\tan\theta$ is small, and F is also small. In other words, it is apparent that the pressing force F can be generally made small when the outside surface 104h of the holding claw 104 is so formed to be the curved surface 104k rather than to be the flat surface 104i.

Embodiment 3

Figure 24:
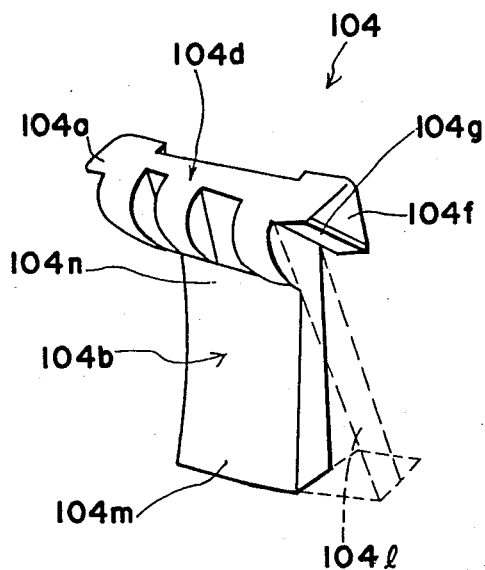
FIGS. 24 and 25 are perspective explanatory views showing the holding claw as shown in FIG. 14.
Figure 25:
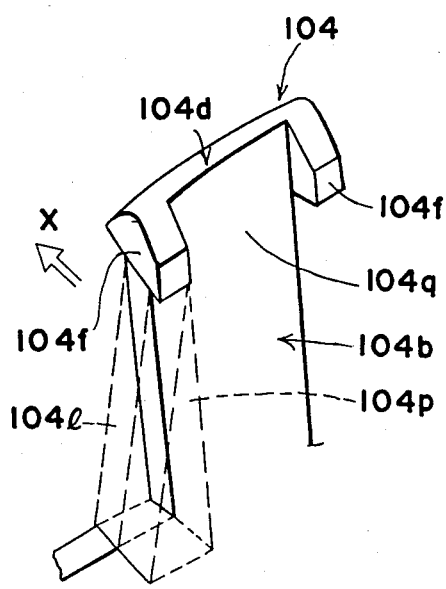
Figure 26:
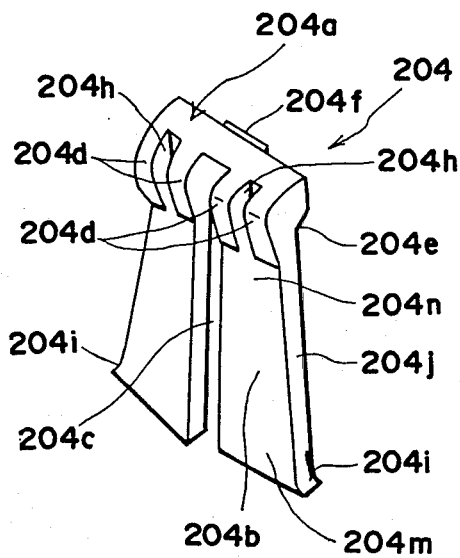
FIG. 26 is a perspective view of a holding claw of a wheel cover according to Embodiment 3 of the present invention.

Embodiment 3, as shown in FIGS. 26 through 32, is an improvement of Embodiment 2. Embodiment 2 has a disadvantage which will be described by making reference to FIGS. 24 and 25. It is to be noted that the wheel cover is generally formed by way of injection molding. As shown in FIGS. 24 and 25, the engaging surface 104g of the protrusion 104f protruding inwardly from the inside surface 104q of the head portion in the radial direction, is formed by means of the outer metal mold 106 (FIG. 19), thereby permitting the engaging-surface-forming portion of the outer metal mold to locate radially inside the leg portion 104b of the holding claw 104. Therefore, in order to outwardly draw the outer metal mold 104p upon completion of the molding process, the leg portion 104b must have approximately the same width from its base portion 104m to a connection portion 104m of the head portion. If the leg portion 21e is, as shown by a dotted line 104l in FIG. 25, so formed that its width increases from the connection portion 104n of the head portion toward the base portion 104m, a triangle portion 104p behind the portion 10l remains when the metal mold is drawn outwardly, i.e., in a direction shown by an arrow X in FIG. 25. In this case, one idea is to draw inwardly the metal mold inwardly, but due to the restriction from the viewpoint of the design of the wheel cover, the metal mold cannot be drawn inwardly. Thus, the leg portion 104b has to be of approximately the same width from the head portion to the leg portion, resulting in an excessive stress at the base portion 104m.

Accordingly, the object of Embodiment 3 is to solve the above-described problems, i.e., to provide a wheel cover wherein the holding claw has sufficient strength and a leg portion is formed such that its width increases from the connection portion of the head portion toward the base portion, resulting in sufficient strength.

Figure 27:
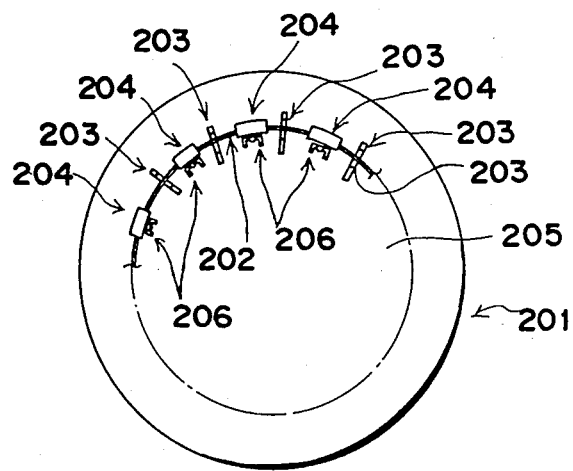
FIG. 27 is a schematic rear view of a wheel cover as shown in FIG. 26.
Figure 28:
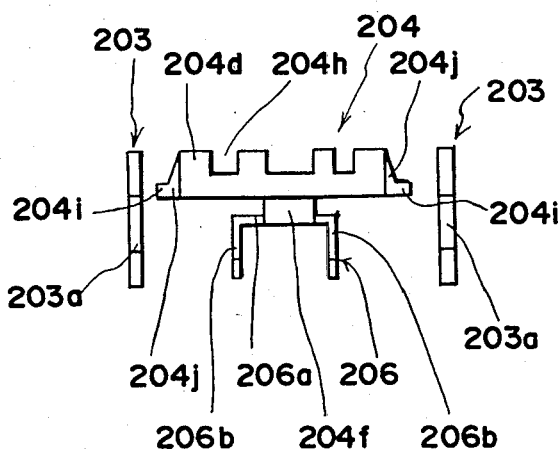
FIG. 28 is an enlarged top plan view of the holding claw and support members as shown in FIG. 27.

Referring to FIGS. 26 through 31, a wheel cover 201 is generally so constructed that, as shown in FIG. 27, a plurality of holding claws 204 are formed on the rear surface of a wheel cover main body 205 which is made of synthetic resin. The holding claw 204 comprises a head portion 204a and a leg portion 204b. A slit 204c is formed in the leg portion 204b. On the head portion 204a is formed a protrusion 204f which engages and holds a wire ring 202 used as a reinforcement resilient member. The wire ring 202, having approximately the same diameter as that of the circumference wherein the holding claw 204 is arranged, is arranged on the rear surface of the wheel cover main body 205 and positioned radially inside the holding claw 204 to be engaged and held by the protrusion 204f. Therefore, when the wheel cover is removably fitted to the wheel 208, each holding claw 204 is pressed to contact with the rim 208a of the wheel 208 with the aid of the resilience of the wire ring 202 and holding 204, thus the wheel cover 201 is mounted on the wheel 208.

The wheel cover main body 205 is formed into approximately the shape of a disc. A plurality of holding claws 204 and support members 203 are integrally formed with the wheel cover main body 205 with regular intervals in the circumferential direction on the rear surface thereof.

The holding claw 204 comprises the leg portion 204b protruding from the rear surface of the wheel cover main body 205, and the head portion 204a is formed at the tip of the leg portion 204b.

The leg portion 204b is so formed that its circumferential width L gradually increases from the connection portion 204n connected with the head portion toward the base portion 204m which connects the wheel cover main body 205, whereby the stress on the holding claw 204 can be made uniform over the entire area of the leg portion 204b. Also, the wire ring 202 is abutted on the inside surface 204e of the head portion so as to be engaged with the protrusion 204f. In this case, since the leg portion 204b is flexible and accordingly slightly it resiliently bends with respect to the rear surface of the wheel cover main body 205. Therefore, the leg portion 204b allows the wire ring 202 to abut smoothly and slightly on the inside surface 204e of the head portion. Furthermore, when the wheel cover 201 is to be fitted into the wheel 208, the leg portion 204b allows each holding claw 204 to bend easily in the radial direction, thereby facilitating the wheel cover 201 to be fitted smoothly into the wheel 208. In both circumferential end surfaces of the base portion 204m of the leg portion 204b, i.e., a side surfaces 204j in the radial direction, a curved surface 204i is formed at the portion connecting each side surface 204j and the wheel cover main body 205, thereby eliminating the stress concentration on the connection portion. In the widthwise central portion of the leg portion 204b, the slit 204c extends from the base portion 204m to the head portion 204a via the connection portion 204n, thus penetrating the leg portion in the radial direction.

Figure 29:
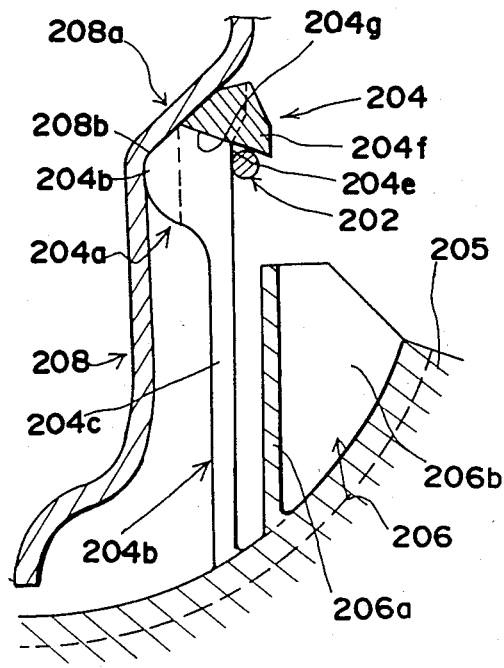
FIG. 29 is a vertical sectional view according to Embodiment 3, showing the configuration wherein the holding claw engaged with a wire ring and a rim of the wheel are being pressed together.
Figure 30:
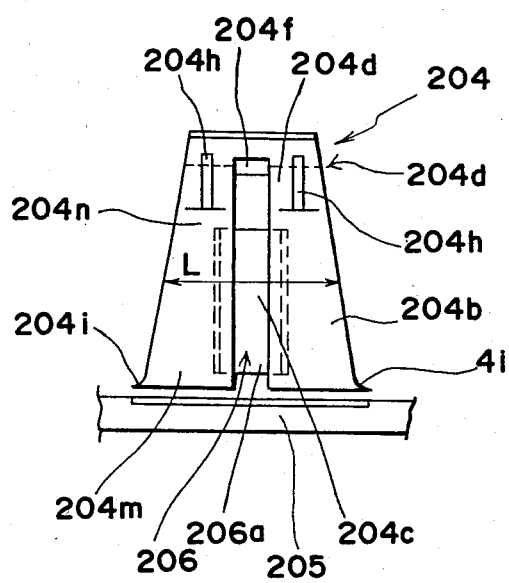
FIG. 30 is a front view of the holding claw as shown in FIG. 26.

An engaging portion 204d protruding outwardly in the radial direction is formed on the outside surface in the radial direction of the head portion 204a. The engaging portion 204d engages with a rim 208a of a concave portion 208b. The inside surface 204e is so arranged as to be present slightly inside the outer diameter of the wire ring 202, so that the wire ring 202 abuts on the inside surface 204e with the aid of resilience of the wire ring thereof so as to press the engaging portion 204d outwardly in the radial direction, i.e., to the engaging portion is pressed toward the rim 208a of the wheel 208. The top end portion of the slit 204c is located at a circumferential central portion of the head portion 204a of the holding claw 204. The protrusion 204f is located at a position adjacent to the top end of the slit 204c. Furthermore, the wire-ring-engaging surface 204g of the protusion 204f extends to the top end surface of the slit 204c. The protrusion 204f is so formed as to have the cross-sectional shape of an approximate triangle protruding inwardly in the radial direction. The inside tip portion in the radial direction of the protrusion 204f protrudes inwardly over the wire ring 202 which abuts the inside surface 204e. The wire-ring-engaging surface 204g of the protrusion 204f facing the wheel cover main body 205 is so formed as to be a slant which inclines with respect to the wheel cover main body 205 from the radially outside portion to the inside portion, wherein the angle formed by the inside surface 204e of the head portion 204a of the holding claw and the wire-ring-engaging surface 204g is less than 90 degrees, thereby preventing the wire ring 202 engaged with the protrusion 204f from being removed from the protrusion 204f in the upward direction as shown in FIG. 29. In addition, concave portions 204h are formed on the head portion 204a between the engaging portions 204d so as to prevent a sink at the time of injectin-molding the holding claw.

Figure 31:
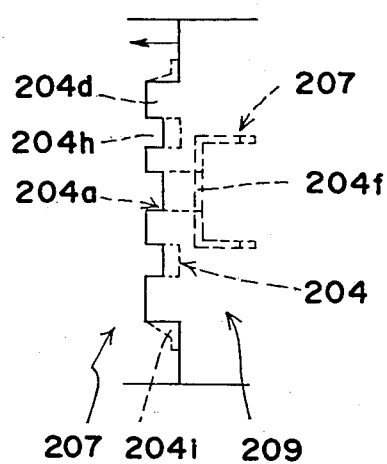
FIG. 31 is an explanatory view according to Embodiment 3, showing the movement of the metal mold when molding the holding claw.

The holding claw 204 is formed by means of the following processes. As shown in FIG. 31, the holding claw 204 is injection-molded by the outer metal mold 207 which can move outwardly in the radial direction (to the left in the drawing), and the inner metal mold 209 which can move in the direction of the thickness of the wheel cover main body. The outer metal mold 207 molds the outside surface of each holding claw 204, i.e., the engaging portions 204d, the outside surface and side surface 204j having the curved surface 204i of the leg portion 204b, the concave portions 204h, as well as the slit 204c of each holding claw 204 and engaging surface 204g of the protrusion 204f, and so on. The inner metal mold 209 molds the inside surface 204e in the radial direction of each holding claw 204, the protrusion 204f, and so on. The holding claw 204 is, therefore, molded by the combination of both metal molds 207 and 209 by means of the conventional injection-molding method.

Further, first support members 203 are integrally formed at constant intervals on the wheel cover main body 205 between the neighboring holding claws 204. A second support member 206 is formed at constant intervals on the inside surface of each holding claw 204. Each first support member 203 is made of an approximately rectangular plate which is positioned on the wheel cover in the circumferential direction in such a way that the plate surface is positioned along the radial direction and has enough width and thickness to prevent itself from being deformed when subjected to the radial force and from being excessively bent when subjected to the circumferential force. At the top end surface of each first support member 203 is formed a groove 203a which controls the radial movement of the foregoing wire ring 202, thereby preventing the wire ring 202 from excessively moving in the radial direction in conjunction with the holding claw 204. Also, second support member 206 includes a central wall 206a and a pair of side walls 206b at both ends of a central wall 206a. The central wall 206a is arranged approximately in parallel with the inside surface 204e of each holding claw 204 so as to face the slit 204c of each holding claw 204. When each holding claw 204 is bent excessively inwardly in the radial direction, the inside surface 204e of each holding claw 204 contacts the central wall 206a of the second support member 206, thereby preventing the holding claw 204 from being excessively bent.

According to the construction described above, as shown in FIG. 29, the wire ring 202 is allowed to directly abut on the inside surface 204e of the head portion 204b and to engage with the protrusion 204f. The wire ring 202 is provided from the rear surface and over the protrusion 204f. The wire ring 202 is inserted into and supported by the groove 203a of the first support member 203 in such a manner as to be movable in the radial direction. When the wire ring 202 is abutted on the inside surface 204e of each holding claw 204, the wire ring 202 is slightly deformed; the resilient force generated by this bending motion acts on the inside surface 204e of each holding claw 204, and slightly presses each holding claw 204 outwardly in the radial direction. Moreover, as shown in FIG. 29, when the holding claws 204 of the wheel cover 201, wherein the wire ring 202 is fitted, are pressed to contact with the rim 208a of the wheel 208 and the holding claws are inwardly bent in the radial direction, the wire ring 202 abutted on the inside surface 204e of the holding claw 204 is inwardly bent with the holding claws 204 in the radial direction. Subsequently, the wheel cover 201 is gradually fitted in the wheel 208, then the wire ring 202, together with each holding claw 204 of the wheel cover 201, is fitted in the wheel 208, with the wire ring 202 being inwardly bent in the radial direction, thus the wheel cover 201 is completely fitted in the wheel 208, whereby the claw body 204d is engaged with the concave portion 208b of the rim 208a of the wheel 208 with the aid of the combined resilient force exerted by the wire ring 202 and the holding claw itself, thus the wheel cover 201 is securely held by the wheel 208. The wheel cover 201 can be removed from the wheel 208 by means of releasing the engagement of some holding claws 204 of the wheel cover 201 with respect to the rim 208a.

According to Embodiment 3 described above, since the wheel cover is so constructed that the slit 204c is formed in the leg portion 204b of each holding claw, wherein the outer metal mold 207 is inserted in the radial direction through the slit 204c so that the wire-ring-engagement surface 204g is formed such that the top end surface of the slit 204c becomes a part of the wire-ring-engagement surface, consequently, even if the inner metal mold 209 is so designed as to be drafted in the direction of the thickness of the wheel cover main body 205, the angle formed by the wire-ring-engaging surface 204g and the inside surface 204e of the head portion can be made to less than 90 degrees. The leg portion 204b can be formed in such a manner that its width increases from the connection portion 204n toward the base portion 4m, and the leg portion 204b can be provided with a sufficient strength, whereby the stress acting on the holding claw 204 can be effectively prevented from increasing excessively. Also, the protrusion 204f having engaging surface 204g for engaging the wire ring 202 at both ends of the head portion 204a, is eliminated and the protrusion 204f is formed at the intermediate portion of both ends, therefore, the leg portion 204b can be so formed as to have the desired width without being restricted by the protrusion 204f. The wire ring 202 can be securely engaged with the engaging surface 204g. Further, the connection portion of each side surface 204j and wheel cover main body 205 can be formed in the form of the curved surface 204i in the base portion 204m of the leg portion 204b, whereby the stress concentration on the foregoing connection portion can be effectively prevented.

Figure 32:
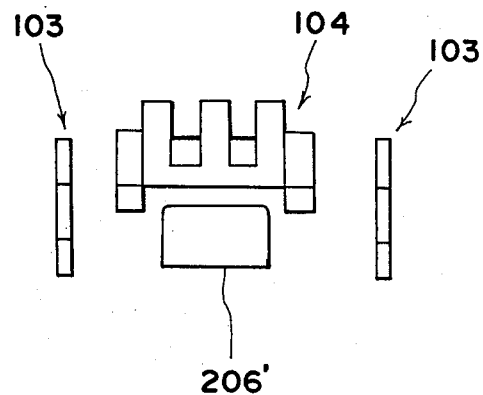
FIG. 32 is a top plan view similar to FIG. 28, showing a modification of Embodiment 3.

The configuration of the foregoing second support member 6 is not limited only to a U-shaped wall, but any other configuration, for example, a support member 206' which is formed from a parallelepiped body, may be utilized as shown in FIG. 32.

Embodiment 4

The Embodiment 1 has such a disadvantage that, when the wheel cover is to be fixed to the rim of the wheel and when the head portion of each holding claw contacts the wheel rim, the head portion may be accidentally guided along the rim toward the center of the wheel, that may be reversely guided in the outward direction, causing the foregoing head portion to bend in the outward direction of the wheel cover main body and not to engage the concave portion of the rim, thus making it difficult to insert the wheel cover into the wheel, and in an extreme case, with the result that the holding claw suffers plastic deformation, cannot be forcibly pressed against the rim, which makes it difficult to attach and hold the wheel cover onto the wheel. The inventors of the present invention have analyzed the cause of this problem as described hereinbelow according to FIGS. 33 and 34. It is to be noted that FIGS. 33 and 34 shows substantially the same holding claw as that of Embodiment 1.

Figure 33:
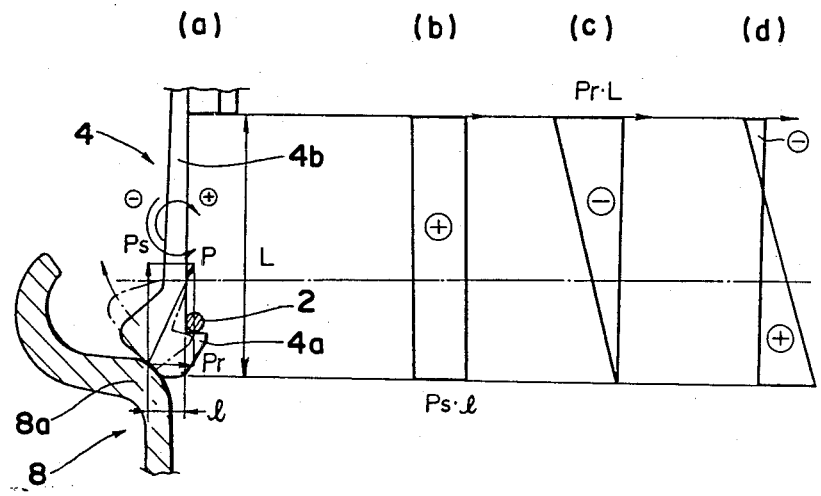
FIG. 33 is an explanatory view showing the relationship between the holding claw and wheel rim of the foregoing wheel cover, as shown in FIG. 10, therein serially presenting: an explanatory view (a) of the arrangement of the wheel and the holding claw; a moment diagram (b) in terms of the component force Ps, in the axial direction of the leg portion, acting on the leg portion of the holding claw; a moment diagram (c) in terms of the radial component force Pr; and a moment diagram (d) showing the sum of both the foregoing moment diagrams.

When each holding claw 4 is, as shown in FIG. 33(a), contacted by the rim 8a of the wheel 8, a reaction force P from the wheel acts on the holding craw 4 at a contact point. This reaction force P can be divided into a component force Ps acting along the axial direction of the leg portion 4b of the holding claw 4 and a component force Pr acting along the direction intersecting orthogonally the above-mentioned direction, i.e., the radial direction of the wheel cover main body. A moment diagram in terms of each component force is shown in FIGS. 33(b) and (c), where the length of the holding claw 304 extending from the rear surface of the wheel cover main body is expressed as L, and the distance from the contact point between the holding claw 4 and the rim 8a to the inside surface of the leg portion 4a for the holding claw 4 is indicated as l. As illustrated in FIG. 33(d), with the sum of the component moments resulting from the above-described component forces, the moment Ps·l, which has a tendency to bend the holding claw 4 is the outward direction, acts on both the head portion 4a and a portion, close to the head portion, of the leg portion 4b, while the moment Pr·L, which has a tendency to bend the holding claw 4 in the inward direction, acts at a portion, on the wheel cover main body, of the leg portion 4b of the holding claw 4. It is conceivable from FIG. 33 that the maximum moment acts on the head portion of the holding claw 4. However, the head portion 4a is free from deformation due to the high geometrical moment of inertia acting therein. Rather, at a constricted portion of the holding claw 4, i.e., at a portion, close to the head portion, of the leg portion 4b, the stress is maximum and the deformation tends to occur. In actuality, the compressed force resulting from the axial component force Ps acts on the holding claw 4 in addition to the foregoing holding moment such that the holding claw 4 is more liable to be subjected to, as it were, neck-breakage.

Figure 34:
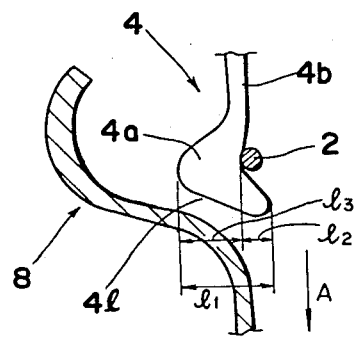
FIG. 34 is an explanatory view showing the relationship between the configuration of the head portion of the holding claw and wheel rim, as shown in FIG. 10.

Referring to FIG. 34, to permit the rim 8a of the wheel 8 to securely facilitate guiding along a guide portion 4l on the top surface of the head portion 4a for the holding claw 4, it is necessary to enlarge as much as possible a radial dimension l1 of a guide portion 4l on the top surface of the head for the holding claw 4. At the same time, since a slope on the internal surface of the head portion for the holding claw 4 is, as it were, an undercut against the mold draw direction (in the direction of an arrow A as indicated in FIG. 34), it is necessary to minimize a radial dimension l2 of an undercut portion so as to reduce forced draw amount with the result that the dimension between the internal surface of the leg portion 4b and the external surface of the head portion becomes large and is expressed as $l_3 = l_1 - l_2$. Consequently, when the head portion 4a of the holding claw 4 is to be bent in the radially inward direction, the dimension l between a contact point, when the rim 8a of the wheel 8 contacts the head portion 4a of the holding claw 4, and the internal surface of the leg portion of the holding claw 4 becomes large, attaining the size of the foregoing dimension l3. Consequently, the moment Ps·l increases, causing the head portion of the holding claw 4 to bend in the radially outward direction, hampering smooth sliding of the head portion 4a along rim 8a toward the center of the wheel, thereby making it difficult to bend the holding claw 4 along the rim in the radially inward direction, which conceivably makes it difficult to fit the wheel cover into the wheel.

The inventors of the present invention have revealed that, in order to prevent the head portion of the foregoing holding claw from bending in the radially outward direction of the wheel cover main body, the external surface of a portion, close to the head portion, of the leg portion, at which the foregoing maximum stress occurs, should be formed by a thick wall so as to increase the geometrical moment of inertia at said portion, thereby preventing extreme lowering of the geometrical moment of inertia at said portion, thus effectively preventing the head portion from bending in the outward direction.

In view of the foregoing problem, the object of this Embodiment 4 is to provide a wheel cover which allows the holding claws to securely bend in the radially inward direction and which can be easily attached to the wheel.

Figure 35:
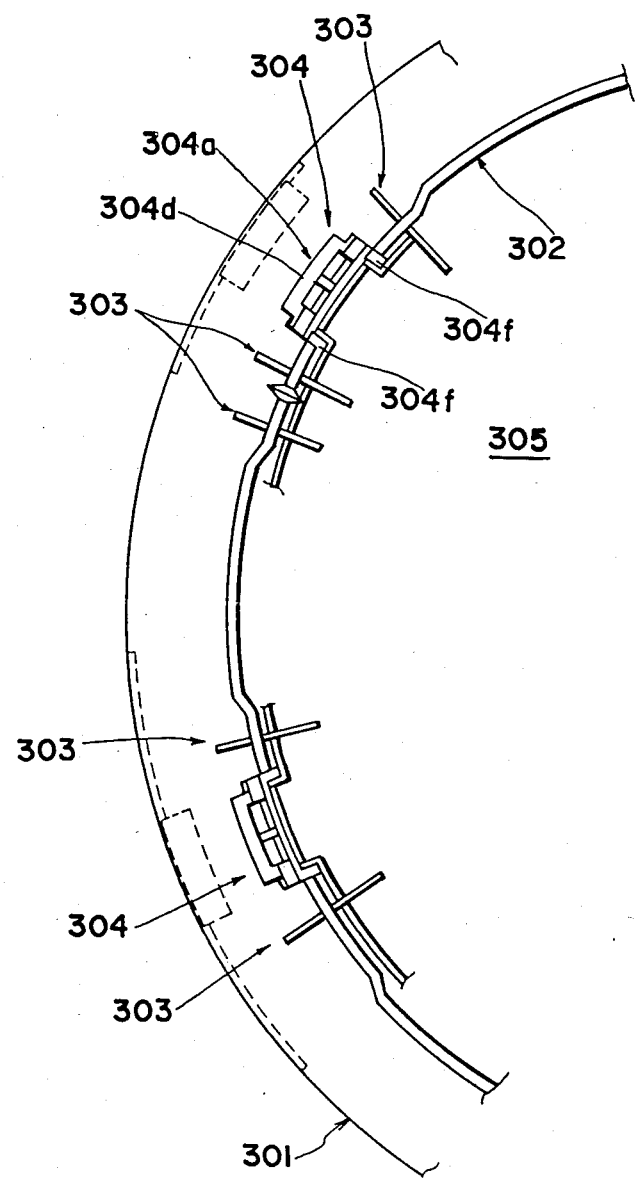
FIG. 35 is a rear view showing a part of a wheel cover according to Embodiment 4 of the present invention.
Figure 36:
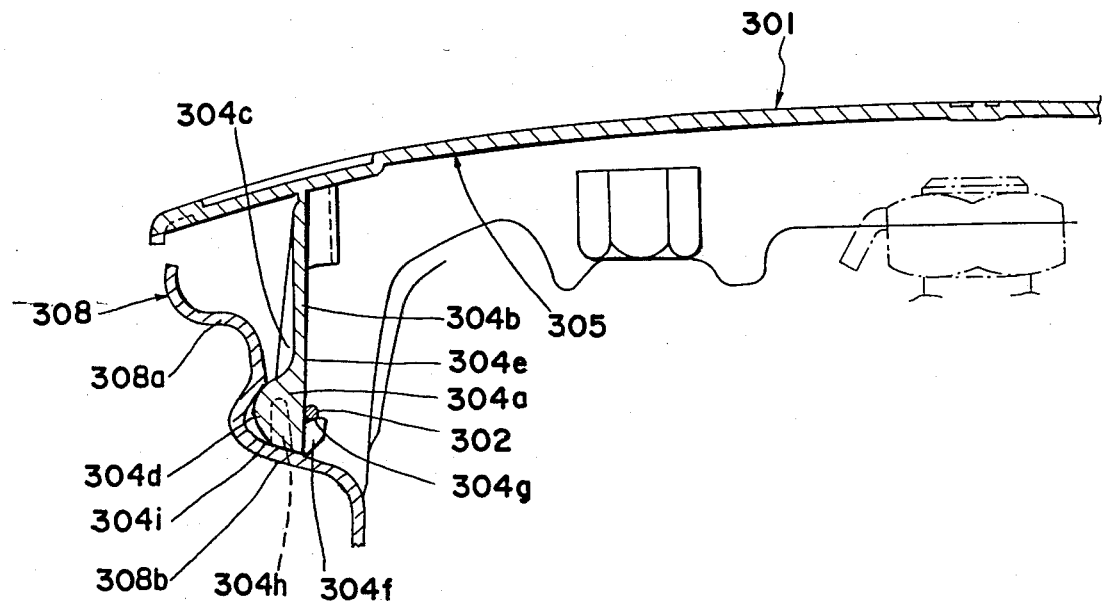
FIG. 36 is a sectional view of the essential part of the wheel cover according to Embodiment 4 which is mounted on a wheel.

Referring to FIG. 35–FIG. 39, the Embodiment 4 is described below;

A wheel cover 301 according to the present embodiment, as illustrated in FIG. 35 and FIG. 36, is so constructed that a plurality of holding claws 304 are integrally formed on the rear surface of an almost circular wheel cover main body 305 made of synthetic resin, and a circular metallic wire ring 302 for reinforcement as a resilient ring is held by each said holding claw 304, wherein, when the wheel cover 301 is removably inserted into a wheel 308, a head portion 304a of each said holding claw 304 is forcibly pressed against a rim 308a of the wheel 308 by means of the resilience of both the foregoing wire ring 302 and each said holding claw 304.

Each foregoing holding claw 304 mainly comprises a leg portion 304b protruding from the rear surface of the wheel cover main cover 305 and a head portion 304a formed at the top of said leg portion 304b. There is provided an engaging portion 304d evaginated on the radial outside of the head portion 304a and fitted into a concave portion 308b of the rim 308a of the wheel 308. There is provided a protrusion 304f in the shape of triangle in section which protrudes from each of both ends along the circumferential direction of the foregoing head portion 304a. Each protrusion 304f protrudes in the radial direction more inwardly than an internal surface 304e of the foregoing head 304a and which abuts on the internal surface 304e so that the wire ring 302 is securely held by each protrusion 304f and is prevented from being removed toward the lower side in view of FIG. 36. The bottom surface of each protrusion 304f is shapely formed into a slope 304g in such a way that the bottom surface approaches the wheel cover main body 305 as it moves in the direction from the outside radius to the inside radius, and an angle formed between the radially inside surface 304e and the foregoing slope 304g is less than 90 degrees. Further, the foregoing leg portion 304b is flexible so that, the wire ring can be fitted into the holding claws 304 and be engaged with the protrusions 304f to be held. Subsequently, the wheel cover 301 can be easily attached to the wheel 308 since the leg portion 304b can be bent inwardly.

Figures 37, 38, 39:
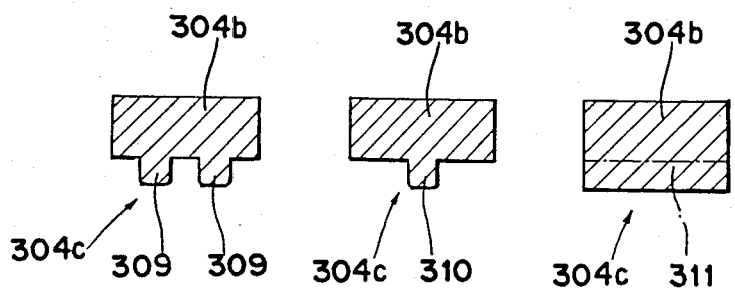
FIGS. 37-39 are enlarged sectional views of the leg portion of the holding claw according to modifications of Embodiment 4, respectively.

A thick reinforcement portion 304c is integrally formed, projecting from a portion, close to the head portion, of this leg portion, i.e., the external surface of a portion where the foregoing moment Ps·l acting on the holding claw 304 becomes high due to the reaction force P generated from the rim 308a when the head portion 304a bends by abutting on the rim 308a of the wheel 308. The side configuration of said reinforcement portion 304c is formed in a triangular shape in such a way that the side of said reinforcement portion 304c becomes thin as it moves in the direction from the vicinity of the head portion toward the wheel cover main body. This reinforcement portion 304c effectively prevents extreme lowering of the geometrical moment of inertia at a portion where the foregoing moment Ps·l of the leg portion 304b becomes high. This reinforcement portion 304c, as illustrated in FIG. 37, may be formed into a shape with two convex portions 309 and 309 at the foregoing corresponding area of the leg portion 304b, one convex portion 310 as shown in FIG. 38, or a convex portion 311 protruding from the entire said corresponding area as shown in FIG. 39. That is, the configuration of the reinforcement portion 304c may be arbitrarily arranged, provided that the above-described measures are attainable. The foregoing reinforcement portion 304c is not necessary a portion, in the vicinity of the wheel cover main body, of the leg portion 304b since the moment is low at a portion close to the wheel cover main body, thus permitting a low geometrical moment of inertia. Concave portions 304h are formed in the foregoing engaging portion 304d so as to prevent sink caused at the time of molding the holding claw.

In FIG. 35, numeral 303 shows a support member. The foregoing circular metallic wire ring 302 is received by a groove or recess on the top end surface thereof so that the radial movement of the wire ring 302 is controlled.

According to this construction, as illustrated in FIG. 36, the wire ring 302 is crossed over the projections 304f of each holding claw 304, with each holding claw 304 being bent, and the wire ring 302, held by both projections 304f of each holding claw 304, is contacted by the internal surface 304e of the head portion 304a. At the same time, the wire ring 302 is inserted into the groove of each support member 303, thereby being allowed to freely make a radial movement within a fixed range when supported thereon. The wire ring 302, when remaining contacted by the internal surface 304e of each holding claw 304, slightly bends, causing the resilience corresponding to the magnitude of the bending to be applied to each holding claw 304; thus each holding claw 304 is slightly pushed onto the outside radius. When the wheel cover 301 is to be attached to the wheel 308, the holding claws 304, which are part of the foregoing wheel cover 301, begin to be successively contacted, by the rim 308b of the wheel 308. When the head portion 304a of each holding claws 304 abuts on the rim 308a of the wheel 308, the reinforcement portion 304c controls the radially outward bending of the head portion 304a of the holding claw 304, causing the head portion 304a to bend in the radially inward direction, sliding along the rim 308a and engaging the concave portion 308b of the rim 308a. Each holding claw 304 is forcibly pressed against 308, thus the wheel cover 301 together with the foregoing holding claw 304 is finally mounted to the wheel 308 with the wire ring 302 being bent. Under this condition, a force, i.e., the sum of the resiliences of the foregoing holding claw itself and the wire ring 302, acts on each holding claw 304, whereby the engaging portion 304d of the head portion 304a for each holding claw 304 engages the concave portion 308b of the rim 308a for the wheel 308 so that the wheel cover 301 is securely fixed to the wheel 308. When the wheel cover 301 is to be removed from the wheel 308, the forcible pressing of the holding claw 304, a part of the wheel cover 301, against the rim 308a for the wheel 308 is released, and the wheel cover 301 can be removed in a manner similar to that of a conventional wheel cover.

According to the above-described embodiment, when the head portion 304a of each holding claw 304 abuts on the rim 308a and is thus subjected to the reaction force therefrom, the head portion 304a has a tendency to bend onto the outside radius of the wheel cover main body 305. However, the reinforcement portion 304c controls the outward bending of this head portion 304a since the reinforcing portion 304c is formed on a portion, close to the head portion, of the leg portion 304b. Thus, the head portion 304a bends inwardly, guidedly slides along the rim, and engages the inside of the concave portion 308b. Consequently, at a portion of the holding claw 304 where the stress is high, i.e., a portion where the moment shown in the moment diagram is high, the geometrical moment of inertia increases with the aid of the reinforcement portion 304c. Furthermore, at a portion, close to the wheel cover main body, of the holding claw 304 where the moment is low, the geometrical moment of inertia decreases due to the absence of the reinforcement portion 304c, whereby the internal stress is uniformly spread throughout the entire leg portion, thus effectively preventing local deformation or bending, and consequently, the wheel cover 301 can be easily attached to the wheel 308. That is, a guiding portion 304i resting against the rim 308a can be securely maintained in each holding claw 304 with the result that the head portion 304a has effective guiding ability, thereby allowing easy attachment of the wheel cover 301 to the wheel 308. Further, at the time of molding each holding claw 304, the amount of undercut against the mold draw direction of the internal surface 304e is possible to minimize, which in turn allows the mold draw by the forced draw, hence low cost of the mold.

What is claimed is:
1. A wheel cover for motor vehicles comprising:
 a wheel cover main body having a plurality of holding claws circumferentially formed on a rear surface thereof;

said holding claws being provided with an engaging portion formed on an inner radial surface thereof;

a resilient reinforcement ring having approximately the same diameter as a diameter defined by said holding claws;

said resilient reinforcement ring being inserted into said engaging portion, whereby said holding claws, when said wheel cover is removably fitted to a wheel, are pressed to contact with a rim of the wheel by an inherent resilience of said holding claws and said resilient reinforcement ring; and a plurality of pairs of support members radially movably supporting said resilient ring, said support members being formed on the rear surface of said wheel cover main body between adjacent ones of said plurality of holding claws and respectively having a pair of radially spaced inner and outer protrusions which enable and regulate the radial movement of said resilient ring and are formed on a surface of said supporting member confronting said wheel whereby a radially inner surface portion of said outer protrusion is positioned radially outside of said engaging member of each said plurality of holding claws.

2. A wheel cover as claimed in claim 1, wherein the head portion of each of said holding claws have a pair of protrusions formed at opposing circumferential ends of each claw which extend inwardly in the radial direction over a radial inside surface of said head portion, said protrusions engaging and holding said resilient ring.

3. A wheel cover as claimed in claim 1, wherein each of said plurality of holding claws includes a leg portion and a head portion, the leg portion of each said holding claw having a slit which radially penetrates said leg portion from a base portion connecting said wheel cover main body to said head portion, a projection being formed on the radial inside surface of the head portion of said slit, protruding substantially inwardly in the radial direction with respect to the radial inside surface of said head portion and having a wire-ring engaging surface which engages and holds said resilient reinforcement ring, and said leg portion having such a dimension that its width gradually increases from a head connection portion to said base portion.

4. A wheel cover as claimed in claim 3, wherein said wire-ring engaging surface and radial inside surface of said head portion make an angle of less than 90 degrees.

5. A wheel cover as claimed in claim 1, wherein said wheel cover further includes a plurality of secondary support members which are formed at constant intervals and at the inner periphery of each of said plurality of holding claws on said main body, whereby each of said secondary support members abut on and supports each of said holding claws in response to a radially inward inclination of said holding claws.

6. A wheel cover as claimed in claim 5, wherein each of said secondary support members includes a central wall confronting an inside surface of said holding claw, and side walls which are provided on each end of said central wall and are positioned along the radial direction of said main body.

7. A wheel cover as claimed in claim 1, wherein said holding claw includes a leg portion and a head portion, the leg portion having a thick reinforcement portion integrally formed on the radially outside surface of said leg portion in the vicinity of said head portion.

* * * * *